July 19, 1966 R. WAGNER 3,261,610

PHONOGRAPH RECORD

Filed May 12, 1965

2 Sheets-Sheet 1

INVENTOR.
ROBERT WAGNER

BY Howson & Howson

ATTYS.

July 19, 1966 R. WAGNER 3,261,610

PHONOGRAPH RECORD

Filed May 12, 1965 2 Sheets-Sheet 2

INVENTOR.
ROBERT WAGNER

BY Howson & Howson

ATTYS.

3,261,610
PHONOGRAPH RECORD

Robert Wagner, Ford Road, Denville, N.J.
Filed May 12, 1965, Ser. No. 455,196
13 Claims. (Cl. 274—42)

This is a continuation-in-part of my copending United States application Serial No. 181,235, filed March 19, 1962 and entitled "Phonograph Record" and now abandoned which in turn is a division of my United States application Serial No. 709,634, filed January 17, 1958 and issued on July 3, 1962 as U.S. Patent 3,042,757, entitled "Stylus Recording With Superimposed High Frequency Excitation."

The present invention is directed to a phonograph record wherein the grooves are formed of a modified shape which results in better trackability, and hence allows the use of less weight in recording in turn improving reproduction fidelity, of the record in playback.

Grooves of records in the prior art have by and large been limited to the specific shape and form of the stylus embossing or cutting the groove. Difficulties in cutting the groove are well documented in the prior art, but these difficulties become even greater where extremely fine grooves and/or slow speeds are required to make a record which will play for an extremely long time. Such grooves must be made very close together and with an extremely small stylus in order to minimize the record area required. Such a small stylus can have only a limited amount of weight applied to it without digging too deeply into the record and catching or otherwise mechanically damaging the record. As a consequence, grooves meeting the other requirements have proved to be relatively shallow and narrow so that trackability, and hence reproduction fidelity, is poor or, in some cases, impossible.

In accordance with the invention of my Patent 3,042,757, means were provided whereby grooves could be made wider and in all respect more trackable. The principal advantage achieved has been to provide a playback stylus which is better retained and tends to stay within the groove more readily. Records having grooves characteristically made by the apparatus of this patent accordingly are improved records whether actually made by the process or otherwise.

The principal object of the present invention is to make a groove which is characteristic of the groove produced by apparatus claimed in Patent 3,042,757 but producible by other means as well.

For a better understanding of the present invention, reference is made to the drawings, in which FIG. 1 is a side elevational view with parts shown in section along the line 1—1 of FIG. 2 of an illustrative phonograph mechanism embodying the invention;

The present invention is directed to a phonograph record having a groove configuration of a particular form. This form may be produced in many ways. It can be embossed using special phonograph recording equipment; it can be cut using special phonograph recording equipment; and it can be reproduced from a master which has been formed in either way. Each of these methods is subject to a considerable number of variations which may differ materially from one another.

The possibility of having a phonograph record of this type in the first place was made possible by the design of certain types of recording equipment and specifically the type shown and described in my now issued U.S. Patent 3,042,757 of which this application is a continuation-in-part. The phonograph of this patent is reproduced in FIGS. 1 and 2 and it will be broadly described herein with detail left to a reference to Patent 3,042,757.

Figures 1, 2:
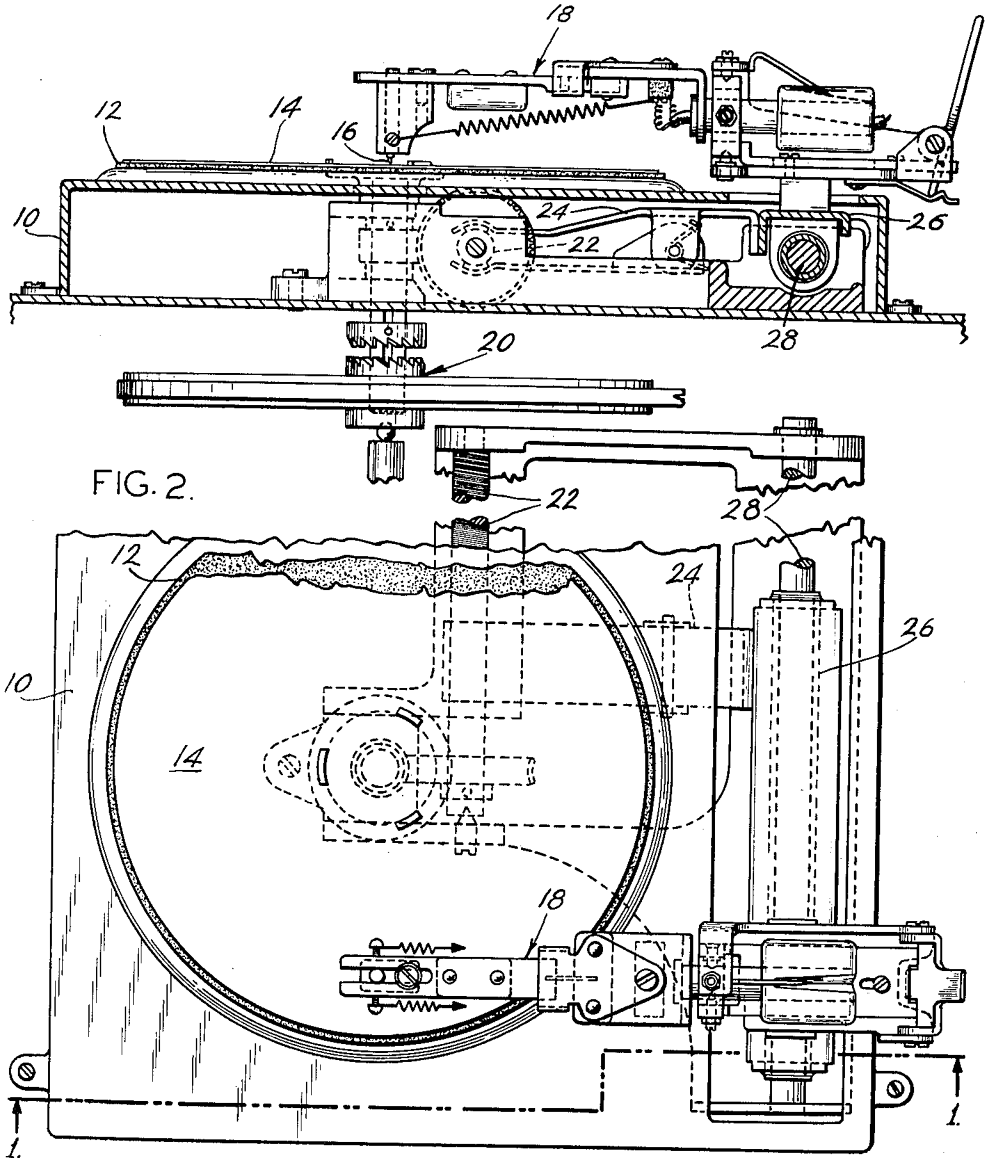
FIG. 2 is a plan view, partially broken away, of said phonograph mechanism.

The phonograph of FIGS. 1 and 2 employs an enclosure 10 for much of the drive mechanism. The enclosure supports fixed record platen 12 at the center of which is a hub 13 connected to the drive means and having suitable means to engage and drive the record above and relative to the platen. A stylus 16 supported by a tone arm generally designated 18 in proper contact with the record embosses or cuts the record material on which the recording is being made as the turntable drives the record beneath the stylus.

Drive of hub 13 is accomplished by motor means (not shown) through a suitable drive line and coupling structure, generally designated 20, which is connected to the hub structure. By suitable connection to the drive line, a lead screw 22 which is coupled by suitable groove spacing averaging means 24 to a support 26 for the tone arm 18 drives said support 26 slidably along rod 28 affixed to the housing. In the manner described in Patent 3,042,757, the tone arm is driven laterally along rod 28 by the lead screw as the hub 13 is rotated and thus the stylus which the tone arm carries forms a generally spiral groove in the record disk 14.

Figures 3, 4, 5, 6, 7, 8, 9, 10, 11, 12, 13, 14, 15, 16:
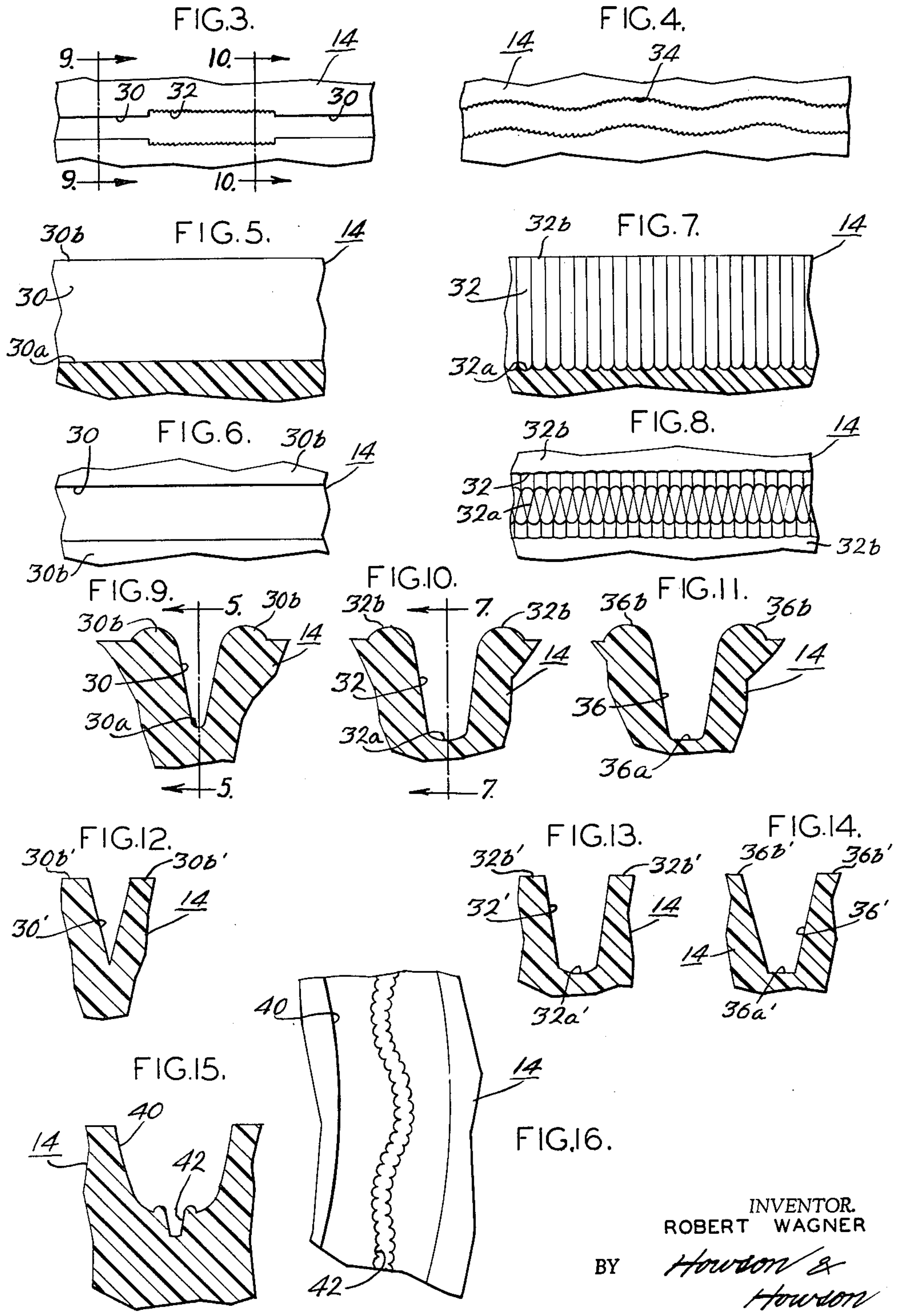
FIG. 3 is a greatly enlarged view of the surface of a phonograph record showing in combination a groove of conventional type and a groove in accordance with the present invention, each unmodulated by an audio signal.
FIG. 4 shows a groove in accordance with the present invention on the same scale as FIG. 3 but wherein a groove of the present invention has been modulated by an audio signal.
FIG. 5 is a sectional view taken along line 5—5 of FIG. 9.
FIG. 6 is a plan view from above of a record groove of the type shown in FIG. 5.
FIG. 7 is a sectional view taken along the line 7—7 of FIG. 10.
FIG. 8 is a plan view from above of a record groove of the type shown in FIG. 7.
FIG. 9 is a cross sectional diagram of the groove of FIG. 3 taken along line 9—9 where the groove is an embossed groove.
FIG. 10 is a cross sectional diagram of the groove of FIG. 3 taken along line 10—10 where the groove is an embossed groove and the stylus producing the groove is of the pivoted type.
FIG. 11 is a diagram similar to FIG. 10 in which the embossed groove is produced by a laterally moving stylus rather than a pivoted one.
FIG. 12 is a cross sectional diagram similar to FIG. 9 but showing a groove cut rather than embossed in the record material.
FIG. 13 is a cross sectional diagram similar to FIG. 10 showing a cut groove in accordance with the present invention wherein the needle is pivoted.
FIG. 14 is a cross sectional diagram similar to FIG. 11 in which the cut groove is produced by a laterally moving stylus rather than a pivoted one.
FIG. 15 is a diagram similar to FIGS. 9–14, but on a somewhat larger scale, showing an audio modulated groove in accordance with the present invention in the bottom of a larger unmodulated groove which had been formed on the record previously.
FIG. 16 is a plan view showing of the superimposed grooves of FIG. 15.

The nature of the groove formed depends upon the type of stylus employed and other features of the tone arm structure and the stylus support. Under high magnification, a conventional unmodulated groove would appear in plan from above the disc like portions 30 of the groove shown in FIG. 3. In accordance with a feature of the phonograph apparatus of Patent 3,042,757, such a groove is modified not only by the usual audible modulation but also a superimposed supersonic frequency. The wider portion 32 of the groove shown in FIG. 3 represents the modification from conventional groove 30 produced by the superposition of a supersonic frequency driving the stylus laterally of the direction of record movement at such a rate that the successive supersonic oscillations cause the laterally extending grooves to overlap one another. By contrast, audible modulation which causes the groove to move laterally in conventional photograph recording technique is at a much slower rate such as that represented in FIG. 4 by the overall waviness of a groove 34 in the record material 14. Groove 34 is of the same type as groove 32 of FIG. 2, that is, it has been formed by a superimposed high frequency effect which tends to widen and deepen the groove. However, the high frequency effect in the excursions produced by the needle traveling at this high frequency are such that because of their overlapping there is no apparent modulation of the groove but rather a uniform widening of the groove which, however, is left with very small scallops along the edge thereof whose curvature is determined by the curvature of the stylus of which they form an impression. Thus, as shown in FIG. 4, there are two signals superimposed on one another, first, the audible signal which is recorded and reproduced and, second, a higher than audible signal which is in effect recorded but not reproduced, first, because it is of a frequency above audibility and, second, because the pickup will not tend to follow the small undulations but rather only the major deviations of the groove.

As an example of the type of stylus that might be used to make these grooves and the parameters involved, FIGS. 3 and 4 might be thought of as being made by the tip of a small stylus having a tip radius of about ¼ mil and a low pressure on the order of 3 to 5 grams force on the record. The disc may be of various materials, such as a flexible polyvinyl chloride, for example. Phonograph speed might typically be eight rotations per minute and by selection of a suitable lead screw, grooves on the order of 500 per inch might be cut. There can be considerable variation in this arrangement but it will be obvious that the combination of factors can be considerably varied. For example, a needle having a diameter of 1 mil or one having a diameter of .5 mil may be used. The recording speed may be four r.p.m. or even less. It will be apparent that as these factors are varied, the record speed will have to be varied to make such that the linear travel of the stylus in the direction of the groove during each vibration cycle is at most equal to the cross sectional dimensions of the portion of the stylus engaging the record. This precaution will cause the stylus in each lateral excursion responsive to said vibrations partially to overlap the path left by the stylus described in the last preceding excursion. Since the effective linear speed decreases as the stylus moves in, one limiting factor in the case of disc recording will be the maximum diameter of the record to be recorded and the effective linear speed to be achieved in the largest diameter groove to be recorded. This will obviously present no problem when recording in a linear medium such as a constant speed belt or tape.

In records made using a .25 mil stylus with a pressure of 3 to 5 grams, an excitation voltage of about 100 volts produced a satisfactory amplitude and at a superaudible frequency of about 30,000 cycles per second. Using the cartridge of Patent 3,042,757, such records have been made which have a response which is substantially flat from 40 to 15,000 cycles and a signal to noise ratio of more than 40 db with a distortion of less than 2%.

Records have been made with a stylus of .1 mil radius with the groove pitch as small as 1.6 mils and a record speed of 8 r.p.m. On a ten inch record with normal recorded area as much as six hours of playing time may be obtained on each side of a record with an average frequency response across the record up to 7500 cycles per second. Even slower speed recording has been accomplished such that ten to twelve hours of playing time is achieved on a single side of a record, the minimum recording rate to date being somewhere on the order of 2 r.p.m. if quality and adequate fidelity are to be maintained.

The effect of the superimposed high frequency current is to drive the stylus in such a manner so as to form a wider groove which also tends to be somewhat deeper and to have a steeper sidewall. In other words, with the same stylus and same low stylus pressure there is obtained a deeper wider groove without incurring record scratching or tearing which inevitably results where an effort is made to form such deep wide grooves by merely increasing the stylus pressure. Some reasons why this occurs are suggested in Patent 3,042,757.

Referring now to FIGS. 5, 6, 7 and 8, the general nature of the groove made in accordance with the present invention may be better understood. These views are further enlarged over FIGS. 3 and 4 for the sake of clarity. FIGS. 5 and 6, for example, show a conventional unmodulated groove, such as groove 30 of FIG. 3, formed without any audio or supersonic modulation. FIGS. 7 and 8 show a groove in accordance with the teaching of the present invention. Use of the superimposed supersonic frequency modulation of such frequency relative to the recording rate that the successive grooves overlap tends to widen the groove as seen in groove 32 of FIG. 3. It also leaves characteristically scalloped sidewalls as illustrated in FIG. 7 and undoubtedly a scalloped pattern on the bottom of the groove as illustrated in FIG. 8. These scallops are so small as to be essentially imperceptible to the naked eye. Even under high magnification the exact pattern of the bottom of the groove is probably impossible to observe so that it can only be inferred. The pattern along the sidewalls, however, can be seen with highly precise magnifying equipment. Moreover, the pattern along the sidewall can be described in terms of the successive concavely scalloped sidewall impressions formed by the stylus. Each such impression has arcuate cross sections in the form of segments of circles. The circles are, of course, the circular cross sections of the recording stylus. Therefore moving toward the bottom of the groove the diameters of the circles arcs sections of the impressions decrease. However, at the level of each section it can be said that the diameter of the circle of which the section is an arc is less than the width of the groove at that level.

Different types of grooves are obtained by different types of stylus. Where the material lends itself to embossing, a groove of a cross section such as that diagrammed in FIG. 9 is produced by conventional recording techniques. The groove 30 characteristically has the rounded bottom conforming to the rounded tip of the stylus and has ridges formed at the top of the groove as a result of displacement of the material by the embossing process. This supposed cross sectional diagram is not intended to necessarily be in proportion but rather to show the nature of the groove formed for a comparison with FIG. 10 which shows a groove formed in accordance with the present invention. The groove 32 of FIG. 10 characteristically has steeper sidewalls. It has a relatively flat but slightly rounded bottom **32*a* and the characteristic ridges 32*b* at the shoulders caused by displaced material as the groove is embossed. The shape of the groove in this instance is determined by the pivoting of a stylus in response to the high frequency excitation which causes the stylus to vibrate laterally back and forth across the record material. The point of pivoting is relatively quite high above the record and, therefore, the arc formed at the bottom of the groove is relatively small but perceptible. The radius between the bottom and the sidewalls is the radius of the stylus tip and if the same stylus is employed as was employed to emboss the groove of FIG. 9 this radius would be the same as the radius 30***a* at the bottom of the groove of FIG. 9. The sidewalls are somewhat steeper because of the pivoting effect which causes the tapered edges of the stylus nearest the wall to approach more nearly the vertical at each end of the arc.

The groove 36 of FIG. 11 is also an embossed groove as can be seen by the ridges 36*b* at its top. However, its bottom 36*a* in this case is flat and the sidewalls are exactly the same angle as the sidewalls of groove 30 as seen in FIG. 9 because in this instance instead of pivoting the needle as a whole is moved laterally. Therefore the angle of the stylus sidewalls to the vertical never change. Both types of movement are possible so that the grooves of both FIGS. 10 and 11 are not only feasible but likely in commercial adaptations.

The groove 30' seen in FIG. 12 differs from the groove 30 of FIG. 9 in that it is a cut groove so that it assumes a sharper point 30*a'* at its bottom, which is characteristic of the cutting stylus. It is also generally flat at the top 30*b'* without the characteristic of the ridges of the embossed groove since the material being cut is removed rather than being displaced. While these characteristics have perhaps been exaggerated in the drawings which are highly diagrammatic, it will be understood by those skilled in the art that the drawings represent a limit in the sharpness of angles shown which is approached but not actually reached in practice.

When supersonic excitation is applied to a pivoted cutting stylus, the groove 30' of FIG. 12 is modified to the groove 32' of FIG. 13, in which the sidewalls are slightly steeper for the same reasons that the sidewalls of the groove of FIG. 10 are steeper than the sidewalls of the groove of FIG. 9 and the bottom 32*a'* is likewise curved in an arc of the circle whose center is at the pivot point. It will be observed, however, that instead of a radius conforming to the radius of the stylus tip, the bottom meets the sidewalls at a sharp angle. In practice a slight curvature, much smaller than that obtained with an embossing stylus, appears at the bottom. Likewise, the top edges 32*b'* of the record adjacent the groove remain flat since in forming the groove material is removed rather than being displaced as in embossing.

FIG. 14 illustrates a groove 36' formed by the superposition of supersonic excitation in a manner similar to the method of formation of groove 32' of FIG. 13 but cut by a stylus whose movement is wholly lateral instead of pivotable. As a consequence, the groove 36' has a bottom 36*a'* which is completely flat and intersects the sidewalls at a sharp angle, which is also somewhat exaggerated in this diagrammatic showing. The sidewalls themselves are at the same angle as the sidewalls in groove 30' of FIG. 12 and, therefore, are not as steep as in the pivoted stylus construction of FIG. 13. Again characteristically the record surface 36*b'* adjacent the groove is not displaced upwardly to form ridges as in the embossed structure since the material is removed by cutting it out.

Instead of forming a groove of the type of the present invention directly in the record surface, it is possible to form a groove within a groove as shown in FIGS. 15 and 16. The principal advantage of such a groove construction is that precision recording equipment such as that of FIGS. 1 and 2 may be eliminated and any free phonograph arm on which a recording head may be placed may be used as a recording stylus mount. Such a modification actually makes recording in the home using slightly modified conventional phonograph reproduction equipment a possibility. Under such circumstances, the great advantage of using the applicant's invention to improve trackability of the grooves, is most desirable. FIGS. 15 and 16 show an unmodulated prerecorded groove 40 which is formed in a record before recording of a modulated groove 42. The modulated groove 42, as can be seen in FIG. 16, takes a modulated overall path as seen in FIG. 16 similar to the path in FIG. 4 except that the path is entirely within the groove 40 and guided and limited thereby. The larger groove 40 is preferably formed by a stylus considerably larger than that which forms the small modulated groove 42. The larger groove retains and guides the stylus as the smaller groove is formed. This larger groove 40 need not have as steep sidewalls as the modulated groove 42 which must retain the playback stylus. The only requirement is that for the particular circumstances, the larger groove be wide and deep enough to prevent the unguided stylus from jumping out of its groove under the force of the modulation effects imposed upon it. One of the possible methods of producing such a combination groove, but not the only one, is disclosed by my United States Patent 3,023,011.

It will be apparent to those skilled in the art that in addition to actually cutting or embossing the records as above described, the grooves may be formed by other processes. They may be formed either by precision recording means or by home recording means using a groove within a groove technique suggested in FIGS. 15 and 16. In addition, the grooves may be formed by a copy process whereby masters of a record formed by apparatus of the type described in my Patent 3,042,757, or of other suitable type, is employed to make the master, and a copy is formed by various known or subsequently discovered techniques.

It will be seen from the above description that the present invention provides an improved type of record having a groove which achieves better trackability than possible in prior art records having grooves of a comparable size. Many modifications of and variations upon the records described are possible within the scope of the claims. For example, possible variations include effects produced by differing relationships between the frequency of the supersonic excitation, on the one hand, and linear speed of recording medium, stylus diameter and stylus pressure against the recording medium, on the other hand, with the supersonic frequency normally increasing as linear speed, for example, increases. All such modifications are intended to be within the scope and spirit of the present invention.

I claim:

1. A record of impressionable material having an embossed groove therein which groove characteristically has concavely scalloped sidewall impressions in the form of adjacent arcuate substantially identical segments of circular sectioned grooves, the circles of which the arcuate sectional segments are a part having diameters less than the width of the groove and which groove additionally undulates laterally in a modulated track in accordance with a recorded audio signal.

2. A record of impressionable material having a continuous groove therein which groove characteristically has concavely scalloped sidewall impressions each impression having adjacent arcuate substantially identical cross sections at a common cross sectional level in the form of segments of circles, the circle of the arc of a particular section having a diameter less than the width of the groove at the level of that section and which groove additionally undulates laterally in a modulated track in accordance with a recorded audio signal.

3. The record of claim 2 in which the groove characteristically has a slightly curved bottom wall.

4. The record of claim 3 in which the slightly curved bottom of the groove terminates gradually in a small radius curve which also terminates the sidewalls.

5. The record of claim 4 in which the groove is bounded on each side by small ridges generally parallel to the groove extending above other areas of the record surface.

6. The record of claim 3 in which the groove having a slightly curved wall at its bottom terminates in an angle with the sidewalls.

7. The record of claim 6 in which the groove is bounded by flat planar surfaces at the record surface.

8. The record of claim 2 in which the groove characteristically has a flat bottom wall.

9. The record of claim 8 in which the flat bottom of the groove terminates in a small radius curve which also terminates the sidewalls.

10. The record of claim 8 in which the flat bottom of the groove terminates in an angle with the sidewalls.

11. A record of impressionable material having a first continuous unmodulated groove therein and a second modulated groove within the first groove which second groove characteristically has concavely scalloped sidewall impressions each impression having arcuate substantially identical cross section at a common cross sectional level in the form of segments of circles, the circle of the arc of a particular section having a diameter less than the width of the second groove at the level of that section and which groove additionally undulates laterally in a modulated track in accordance with a recorded audio signal.

12. A record of impressionable material having a groove means forming a prerecorded guide groove for subsequent recording of an audio signal which groove characteristically has concavely scalloped sidewall impressions in the form of adjacent arcuate substantially identical segments of circular sectioned grooves, the circles of which the arcuate sectional segments are a part having diameters less than the width of the groove.

13. A record of impressionable material having a continuous groove means forming a prerecorded guide groove for subsequent recording of an audio signal which groove characteristically has concavely scalloped sidewall impressions each impression having adjacent arcuate substantially identical cross sections at a common cross sectional level in the form of segments of circles, the circle of the arc of a particular section having a diameter less than the width of the groove at the level of that section.

References Cited by the Examiner

UNITED STATES PATENTS

| | | | |
|---|---|---|---|
| 1,580,567 | 4/1926 | Owen et al. | 274—42 |
| 2,019,215 | 10/1935 | Dippel | 274—43 |
| 2,819,089 | 1/1958 | Williams et al. | 274—42 X |

FOREIGN PATENTS

| | | |
|---|---|---|
| 431,967 | 7/1935 | Great Britain. |

NORTON ANSHER, *Primary Examiner.*

C. B. PRICE, *Assistant Examiner.*